(12) United States Patent
Abrams

(10) Patent No.: US 10,344,902 B2
(45) Date of Patent: Jul. 9, 2019

(54) SAFETY SYSTEM FOR CONDUITS

(71) Applicant: Andrew Charles Abrams, Springfield, PA (US)

(72) Inventor: Andrew Charles Abrams, Springfield, PA (US)

( * ) Notice: Subject to any disclaimer, the term of this patent is extended or adjusted under 35 U.S.C. 154(b) by 0 days.

(21) Appl. No.: 15/854,020

(22) Filed: Dec. 26, 2017

(65) Prior Publication Data

US 2018/0180212 A1 Jun. 28, 2018

Related U.S. Application Data

(60) Provisional application No. 62/439,084, filed on Dec. 26, 2016.

(51) Int. Cl.
| | | |
|---|---|---|
| *F16L 55/10* | (2006.01) | |
| *B67D 7/32* | (2010.01) | |

(52) U.S. Cl.
CPC ........ *F16L 55/1015* (2013.01); *B67D 7/3218* (2013.01); *F16L 55/1007* (2013.01)

(58) Field of Classification Search
CPC . F16K 17/406; F16L 55/1015; F16L 55/1022; F16L 55/1007; B67D 7/3218
USPC .............................................. 137/68.14, 312
See application file for complete search history.

(56) References Cited

U.S. PATENT DOCUMENTS

| | | | |
|---|---|---|---|
| 3,963,055 A | 6/1976 | Derosa | |
| 4,287,904 A | 9/1981 | Kushner | |
| 4,426,109 A | 1/1984 | Fike, Jr. | |
| 4,614,201 A * | 9/1986 | King et al. | ............... F16K 17/40 137/312 |
| 4,872,471 A | 10/1989 | Schneider | |
| 4,898,199 A | 2/1990 | Morris | |
| 5,357,998 A | 10/1994 | Abrams | |
| 5,365,973 A | 11/1994 | Fink, Jr. | |
| 6,182,695 B1 | 2/2001 | Coates, III | |
| 6,192,934 B1 | 2/2001 | Coates, III | |
| 6,260,569 B1 | 7/2001 | Abrams | |
| 6,546,947 B2 | 4/2003 | Abrams | |
| 6,722,405 B2 | 4/2004 | Cessac | |
| 6,802,332 B1 | 10/2004 | Stuart | |
| 6,862,852 B1 | 3/2005 | Beele | |
| 6,899,131 B1 | 5/2005 | Carmack | |
| 6,938,636 B1 | 9/2005 | Nimberger | |
| 7,066,193 B2 | 6/2006 | Aderholt | |
| 7,165,576 B2 | 1/2007 | Carmack | |
| 7,264,014 B2 * | 9/2007 | Boyd | .................... F16L 55/005 137/614.04 |
| 7,278,440 B2 * | 10/2007 | Boyd | .................... F16K 17/366 137/614.04 |
| 7,607,700 B2 | 10/2009 | Duquette | |
| 7,624,792 B2 | 12/2009 | Wright | |
| 7,753,067 B2 | 7/2010 | Bolt | |
| 8,096,315 B2 | 1/2012 | Bolt | |
| 8,118,049 B2 | 2/2012 | Cardona | |
| 8,387,646 B2 | 3/2013 | Bolt | |

(Continued)

*Primary Examiner* — Kevin L Lee
(74) *Attorney, Agent, or Firm* — Cheryl R. Figlin

(57) ABSTRACT

A fluid delivery system having a safety system with a breakaway component. Breakaway component further comprising an internal tube that also has breakaway capacity to prevent leaks before breakaway. Also a break away system have a turbulence coil within the break away portion of the conduit to enhance the protection provided by the safety system.

12 Claims, 10 Drawing Sheets

(56) References Cited

U.S. PATENT DOCUMENTS

| | | |
|---|---|---|
| 8,656,940 B2 | 2/2014 | Abrams |
| 8,746,278 B2 | 6/2014 | Py |
| 8,766,110 B2 | 7/2014 | Daughtry |
| 8,800,586 B2 | 8/2014 | Abrams |
| 8,905,081 B2 | 12/2014 | Lee |
| 8,991,415 B1 | 3/2015 | Luppino |
| 2010/0201124 A1 | 8/2010 | Duquette |
| 2011/0214750 A1 | 9/2011 | Abrams |
| 2014/0116515 A1* | 5/2014 | Konishi .............. F16L 55/1007 137/1 |

* cited by examiner

SAFETY SYSTEM FOR CONDUITS

FIELD OF THE DISCLOSED TECHNOLOGY

The disclosed technology relates to fluid delivery system having a safety system with a breakaway component.

BACKGROUND OF THE DISCLOSED TECHNOLOGY

There are many instances where fluids or gases are delivered at high pressure through a system of conduits. There is significant risk associated with failure of these delivery systems. Unintentional releases of these fluids or gases pose significant health risks as well as property damage. When a system fails by rupturing or splitting there are safety systems that can contain the discharge of liquids or gases. Some of these safety systems can leak over time. It would be desirable to have a system with an internal tube that also has breakaway capacity to prevent leakage or spillage.

Another feature currently missing from safety systems is a process to decelerate highly pressurized fluids. Combining a coil within the break away portion of the conduit will enhance the protection provided by the safety system. Finally, a safety system in which there is close proximity of the valves to a breakaway seam, simplifies the safety mechanism especially where the diameter of the tubing is too small to allow a conduit between the valves.

SUMMARY OF THE DISCLOSED TECHNOLOGY

Aspects of the disclosed technology, according to some embodiments thereof, relate to providing a safety system for conduits comprising a conduit having a first and second end and a housing at each end of the conduit defining a valve seat, each valve seat normally being a first predetermined distance from the other, and being movable away from the other when the conduit fails.

Safety conduit further comprising a breakaway flange located between said ends having a seam for separation when conduit fails and a tube inside the conduit. The tube is attached inside of and extends distally beyond the seam of the conduit and an entire circumference of the tube is affixed to the inner portion of the conduit creating a seal such that leakage at the seam during normal operation is prevented. Optionally the tube is an accordion tube. The safety conduit further comprises a turbulence coil inside safety conduit.

One objective is to have a safety system for conduits comprising a conduit having an inner portion and outer portion and a first and second end. Also comprising a housing at each end of the conduit defining a valve seat, each valve seat normally being a first predetermined distance from the other, and being movable between that distance to an opened and closed position. Means for keeping valve seat in an open position and for movement of the valve seat to a closed position when conduit fails and breakaway flanges located between said ends having a seam for separation when conduit fails. A tube inside the inner portion of said conduit wherein the tube is attached inside of the seam of the conduit and extends distally on either side of said seam of the conduit; and wherein an entire circumference of the tube is affixed to the inner portion of the conduit creating a seal of the seam of said conduit such that leakage at the seam during normal operation is prevented.

Another objective is to have a safety system where the tube has a shearing point for separation when conduit fails and the tube is an accordion tube. The tube is made of one of the following: annular convoluted metal core; helical convoluted PTFE core, stainless steel, rubber, or PVC.

In a further objective of the disclosed technology bolts or pins maintain the breakaway flanges in a sealed position and the bolts or pins either tensile or sheer at conduit fail. The tube has a shearing point that will break away with enough pressure at conduit fail. The tube is affixed to the inner portion of the conduit by welding. In a safety system for conduits a turbulence coil is inside the safety conduit or inside a tube inside the conduit.

In a final objective of the disclosed technology there is a safety system for conduits having an inner portion and outer portion and a first and second end with a housing at each end of the conduit defining a valve seat, and each valve seat normally being a first predetermined distance from the other.

The valves being movable between that distance to opened and closed position and means for keeping valve seat in an open position and for movement of the valve seat to a closed position when conduit fails. Also, breakaway flanges located between the ends having a seam for separation when conduit fails, as well as, a turbulence coil inside said conduit for slowing the flow velocity of certain volatile substances to prevent combustion.

In accordance with these and other objectives, which will become apparent hereinafter, the disclosed technology will now be described with particular reference to the drawings.

Figure 1:
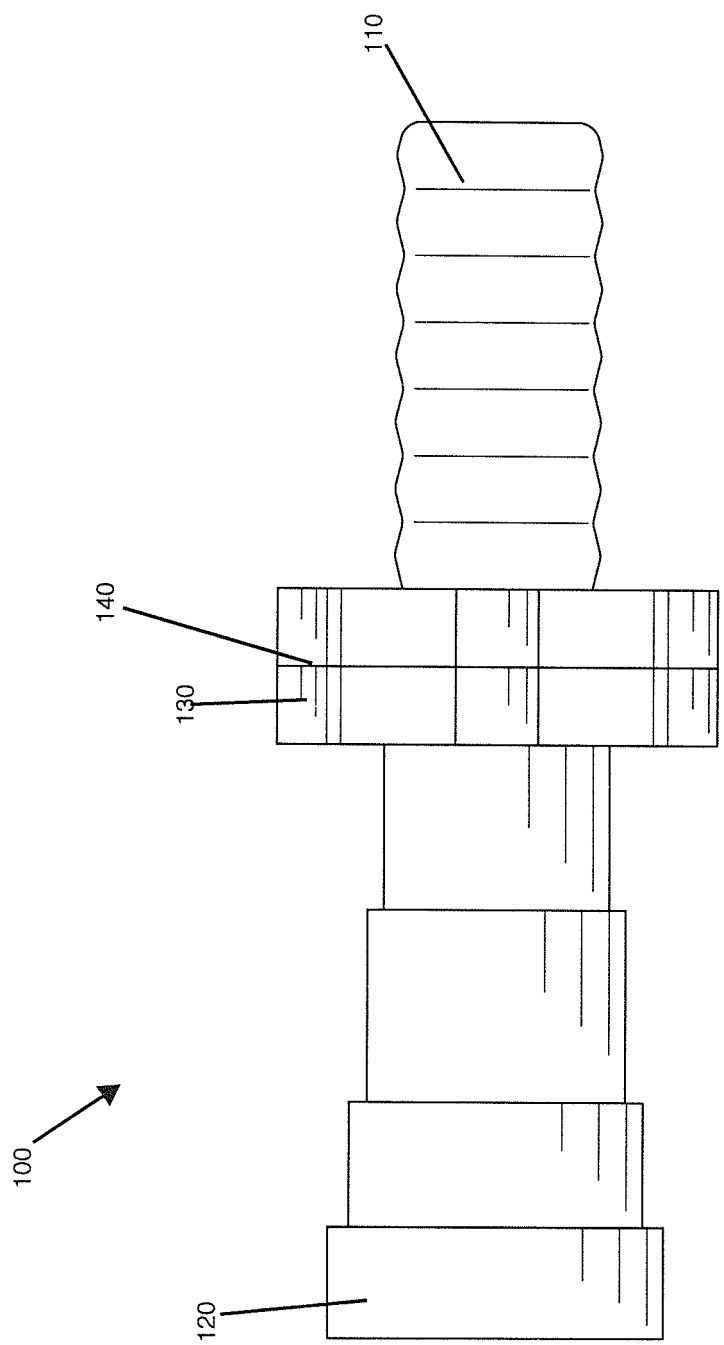
FIG. 1 shows a front view of the safety system for fluid conduit before separation.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The ensuing detailed description provides preferred exemplary embodiments only, and is not intended to limit the scope, applicability, or configuration of the disclosed technology. Rather, the ensuing detailed description of the preferred exemplary embodiments will provide those skilled in the art with an enabling description for implementing the preferred exemplary embodiments of the technology. Various changes may be made in the function and arrangement of elements without departing from the spirit and scope of the disclosed technology, as set forth in the appended claims.

To aid in describing the disclosed technology, directional terms may be used in the specification and claims to describe portions of the present technology (e.g., upper, lower, left, right, etc.). These directional definitions are merely intended to assist in describing and claiming the disclosed technology and are not intended to limit the disclosed technology in any way. In addition, reference numerals that are introduced in the specification in association with a drawing figure may be repeated in one or more subsequent figures without additional description in the specification, in order to provide context for other features.

With reference now to the drawings, a device is shown for a safety system for fluid and gas conduits.

Figure 2:
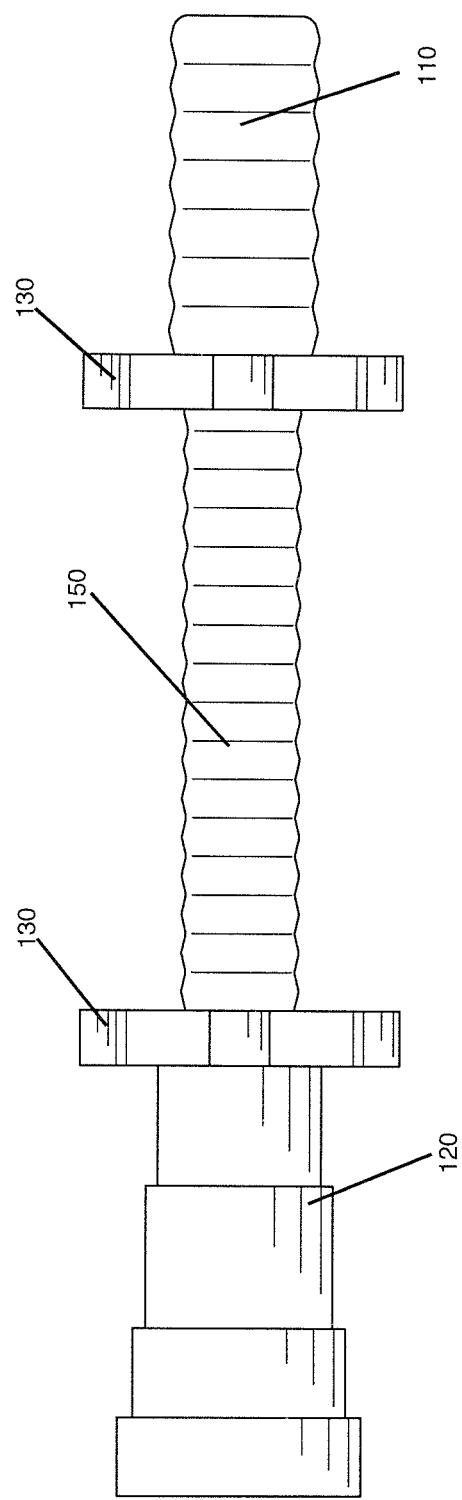
FIG. 2 shows a front view of the safety system for the fluid conduit in the process of separation.

Referring to FIGS. 1 and 2, reference number 100 refers generally to a safety system conduit. One end of conduit 110 is for connecting to other elements in a fluid handling system. Second end of conduit 120 is also for connecting to other elements in the fluid handling system. Breakaway flanges 130 and breakaway seam 140 of conduit 100 constitute the first aspect of the safety system.

A second aspect of the safety system is the presence of safety valves 190 within conduit 100, positioned on either side of the breakaway flanges 130. See FIGS. 7 and 9. Said valves 190 are movable between open and closed positions. The valves 190 remain open as long as the safety apparatus remains intact. In the event of a breakaway, the valves 190 are moved to the closed position preventing leakage or spillage of the liquids or gases contained within the system.

Figure 7:
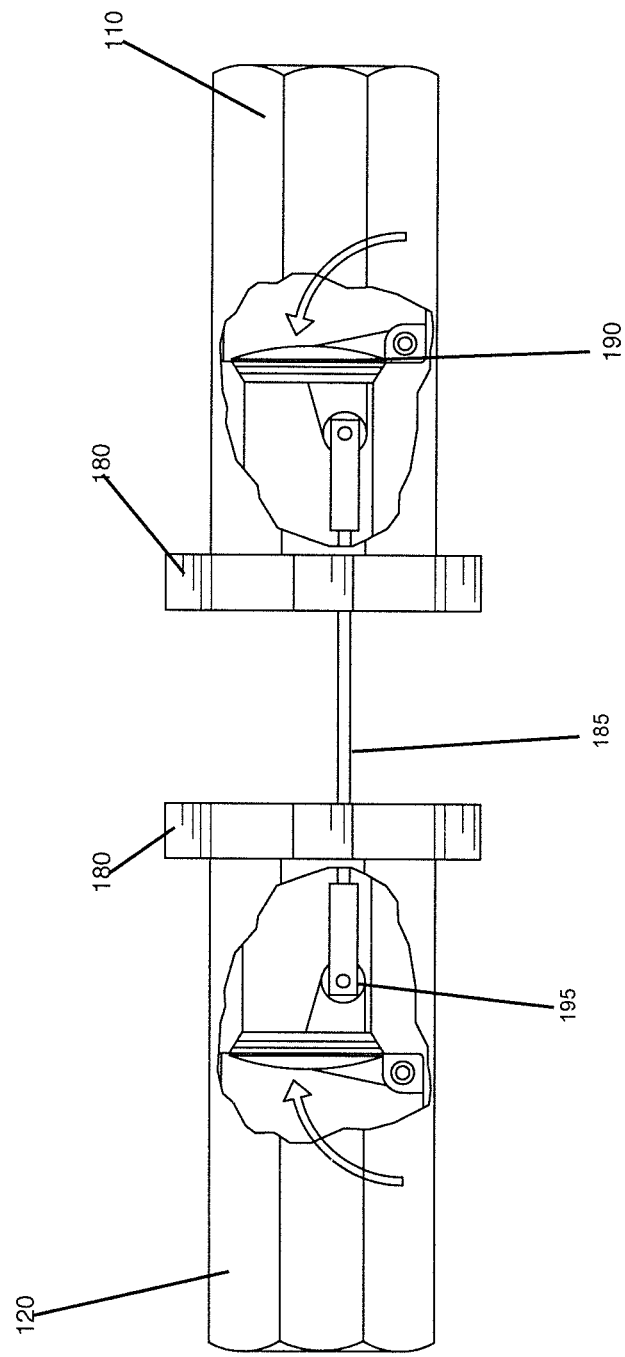
FIG. 7 is a front and cut away view, according to some embodiments, after separation.

It is appreciated that any well-known means in the art for changing valve positions is consistent with the current disclosure. One example for moving the valves 190 between positions is, the valves 190 at rest prefer a closed position and a spring (not shown) maintains the valves 190 on the wall of the conduit until conduit failure. At conduit failure, the spring fails and valves 190 move to the rest position which closes the valve 190. Another option is valves 190 at rest prefer an open position on the conduit wall and a rod 185 (as seen in FIG. 7) between said valves 190, at conduit failure, said rod 185 at conduit failure pulls the valves 190 to a closed position.

Accordion shearing tube 150 is inside the conduit 100. In the event of a separation, breakaway flanges 130 would disconnect at breakaway seam 140 exposing and expanding the accordion shearing tube 150. The accordion shearing tube 150 is attached inside of and distally on either side of a seam 140 of the conduit 100. The accordion shearing tube 150 is affixed around the shearing tube 150 entire circumferences to the inner portion of the conduit 100 creating an O-ring or any similar type seal.

Figure 3:
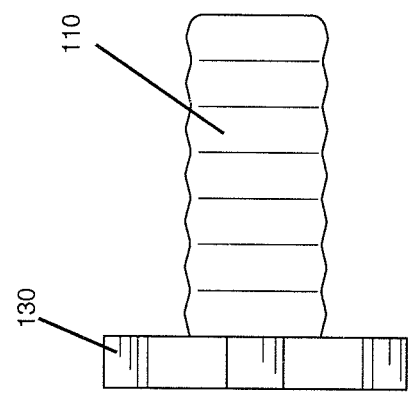
FIG. 3 shows a front view of safety system for the fluid conduit after complete separation.
Figure 3:
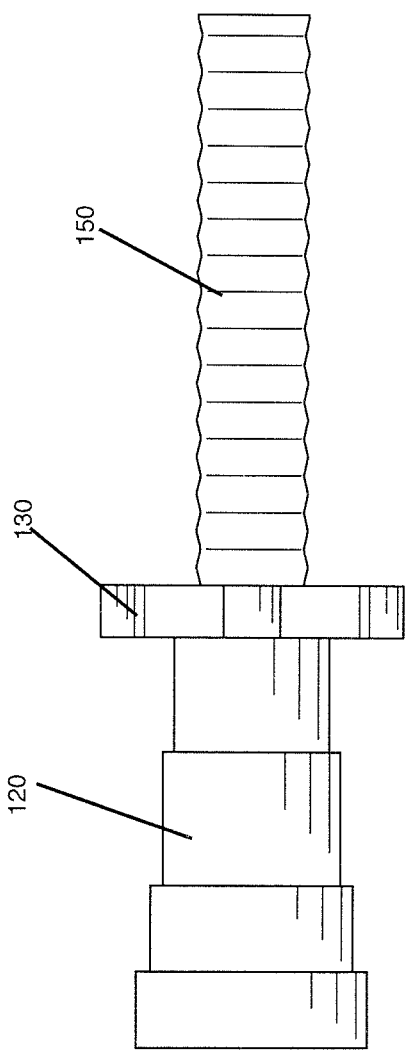

A preferred method of affixing the accordion shearing tube 150 to the inner portion of conduit 100 is welding. One preferable welding technique is an increased weld ferrule. In some embodiments, any well know method for affixing the accordion shearing tube 150 to the inner portion of conduit 100, as well as any well know welding method is consistent with the disclosed technology. This shear tube seal prevents decay and separation and thus leakage during normal operation. When enough pressure is exerted on accordion-shearing tube 150 a shearing point of accordion-shearing tube 150 also breaks away as illustrated by FIG. 3.

Figure 4:
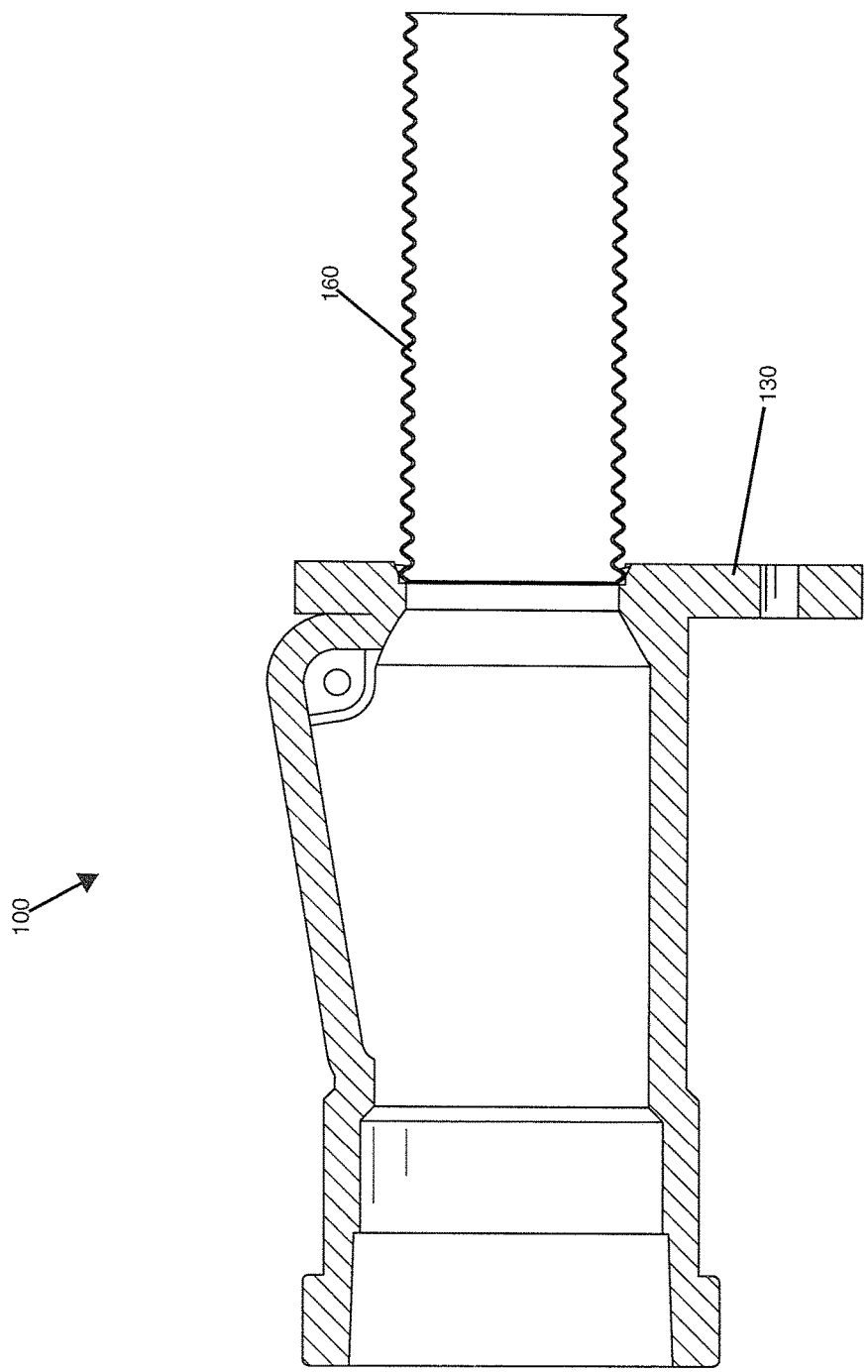
FIG. 4 is a cut away partial view, according to some embodiments, of the safety system for the fluid conduit with an internal tube attached to one end of the safety system.
Figure 5:
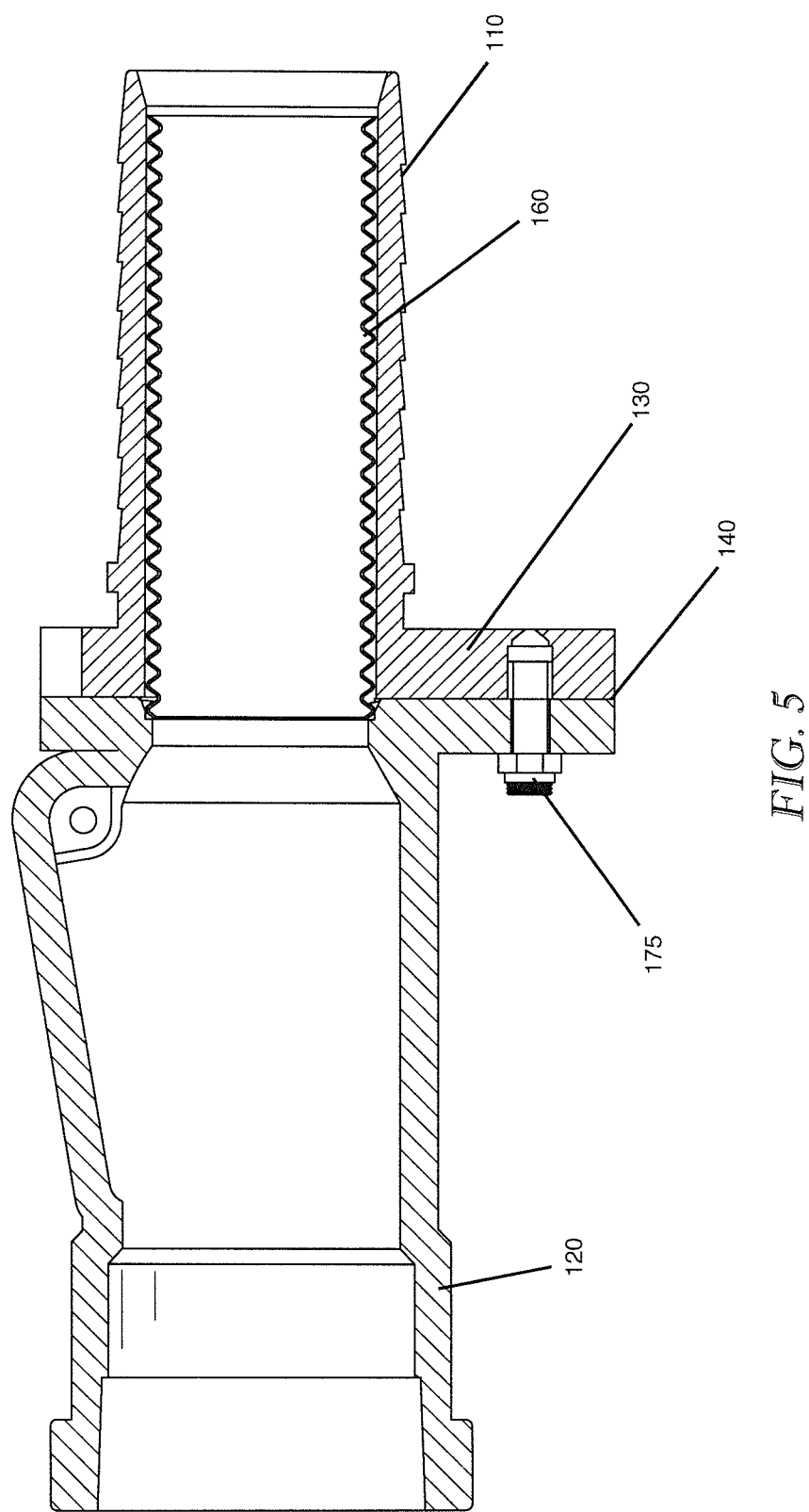
FIG. 5 is a cut away partial view, according to some embodiments, of the safety system for the fluid conduit with the internal tube attached to both ends of the safety system.

FIGS. 4 and 5 illustrate a shearing tube 160, in some embodiments, that do not accordion. One end of conduit 110 is for connecting to other elements in a fluid handling system. Second end of conduit 120 is also for connecting to other elements in the fluid handling system. The shearing tube 160 is attached inside of and distally on either side of a seam 140 of the conduit 100. The entire circumference of shearing tube 160 is affixed the inner portion of the conduit 100 creating an O-ring type seal.

In case of separation, bolts or pins 175 and breakaway seam 140 will separate internal valves 190 engage and the shearing tube 160 remains intact with flow stopped on both ends of the conduit 100. Bolts 175 are preferably tensile or sheer bolts. The bolts 175 maintain the breakaway flanges 130 in a sealed position before conduit failure. Shearing tube 160 also has a shearing point that will break away with enough pressure.

Shearing tube 160 and accordion shearing tube 150, in some embodiments, is preferably one of the following; annular convoluted metal core, helical convoluted PTFE core, or stainless steel. Alternatively, in some embodiments, shearing tube 160 and accordion shearing tube 150 is made out rubber, PVC, and any metal including PTFE. This shear tube seal prevents decay and separation and thus leakage during normal operation.

Figure 6:
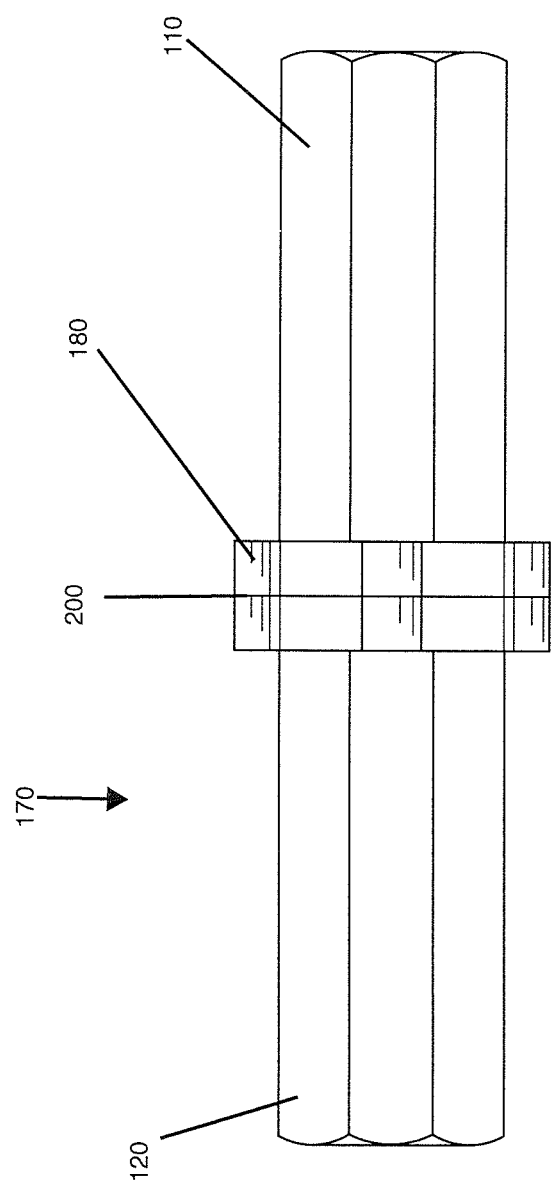
FIG. 6 is a front view, according to some embodiments, of the safety system for the fluid conduit before separation.

FIG. 6 illustrates safety conduit 170 with breakaway flanges 180. In some embodiments, one end of conduit 110 is for connecting to other elements in a fluid handling system. Second end of conduit 120 is also for connecting to other elements in the fluid handling system. In some embodiment the valves 190 are in closer proximity to a breakaway seam 200 as shown in FIG. 7. Said valves 190 are movable between open and closed positions. They remain open as long as the safety apparatus remains intact. In the event of a breakaway the valves 190 are moved to the closed position preventing leakage or spillage of the liquids or gases contained within the system.

Figure 9:
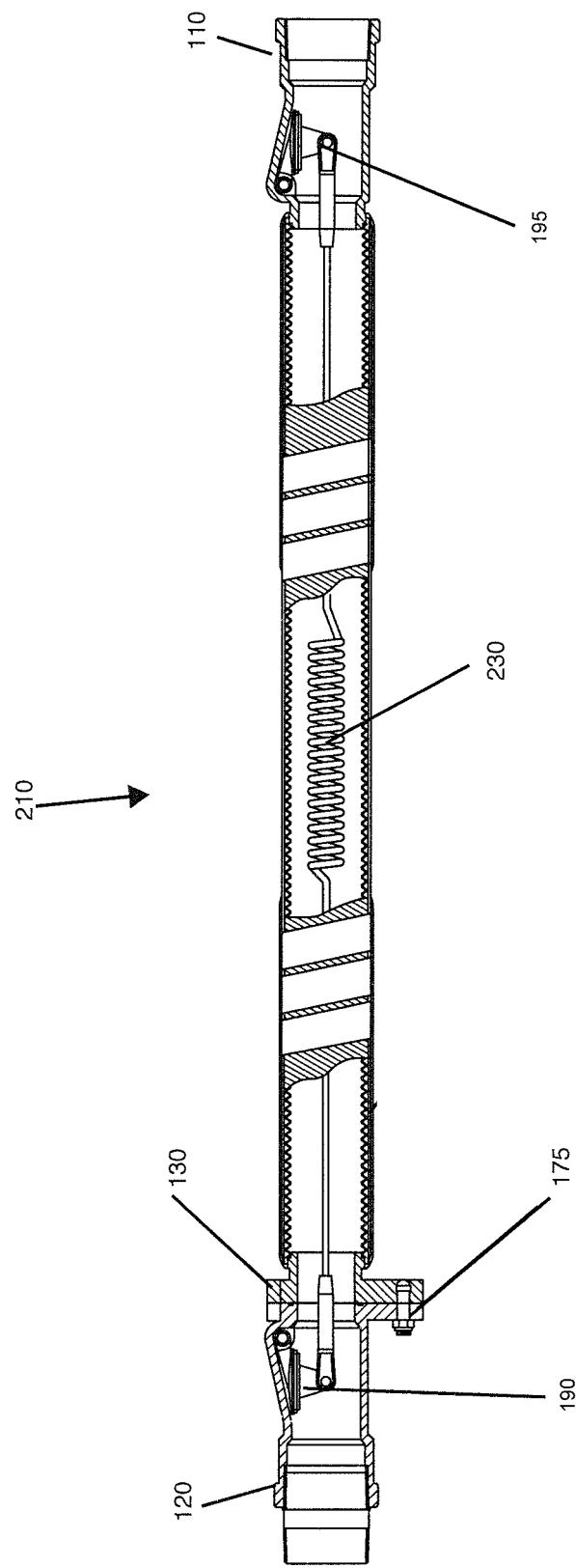
FIG. 9 is a cut away view, according to some embodiments, of the safety system for the fluid conduit.
Figure 10:
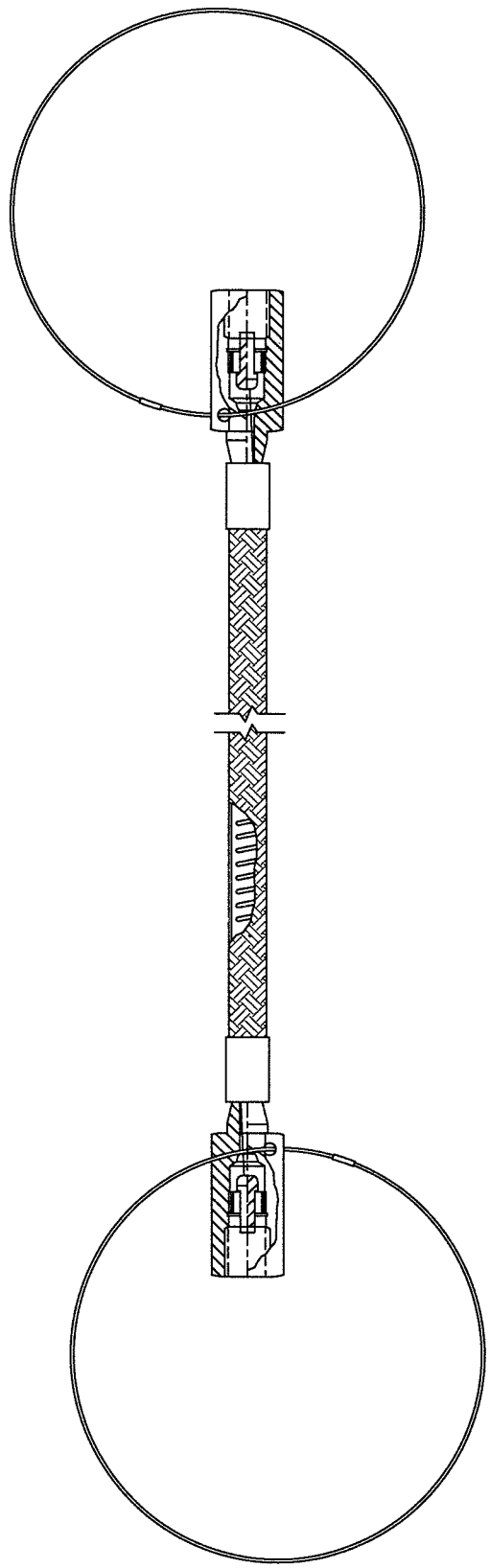
FIG. 10 is a view, according to some embodiments, of the safety system for the fluid conduit.

Valves 190 in some embodiments have a pivot point 195, placed adjacent to the circumference than the center of the valve 190, as seen if FIG. 7. Some embodiments have valves 190 with a pivot point 195, placed at the center of the valve 190, as seen in FIG. 9

Figure 8:
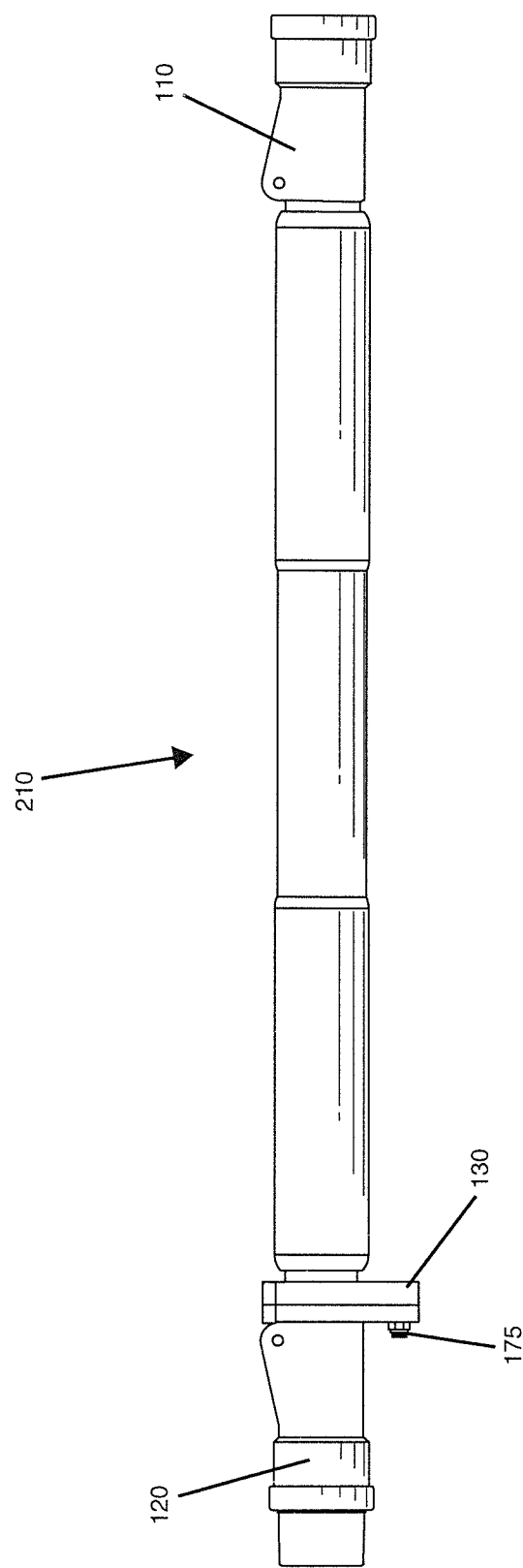
FIG. 8 is a front view, according to some embodiments, of the safety system for fluid conduit.

Certain gasses and fluids transferred through conduits need a turbulence coil to decelerate flow velocity preventing combustion. FIGS. 8 and 9 illustrate some embodiments of the safety conduit 210. One end of conduit 110 is for connecting to other elements in a fluid handling system. Second end of conduit 120 is also for connecting to other elements in the fluid handling system. Valves 190 are movable between open and closed positions. A turbulence coil 230 is also inside the safety conduit 210. Combining a turbulence coil 230 within the breakaway conduit 210 provides two aspects of safety within the same system. In some embodiments, there is also a shearing tube 160 placed in the safety conduit as well as a turbulence coil 230.

It is recognized by those skilled in the art that changes may be made to the above-described embodiments of the disclosed technology without departing from the broad inventive concept thereof. It is understood, therefore, that this technology is not limited to the particular embodiments disclosed but is intended to cover all modifications which are in the spirit and scope of the disclosed technology.

I claim:
1. A safety system for conduits comprising:
   a. a conduit having an inner portion and outer portion and a first and second end;
   b. a housing at each end of the conduit defining a valve seat, each valve seat normally being a first predeter- mined distance from the other, and being movable between that distance to opened and closed position;

c. means for keeping the valve seat in an open position and for movement of the valve seat to a closed position when conduit fails;

d. breakaway flanges located between said ends having a seam for separation when the conduit fails;

e. a tube inside said inner portion of said conduit wherein the tube is configured to seal the seam of the conduit preventing leakage during normal operation of the safety system and the tube is attached inside of the seam of the conduit and extends distally on either side of said seam of the conduit; and f. an entire circumference of said tube is affixed to the inner portion of the conduit creating a seal of the seam.

2. The safety system for conduits of claim 1, wherein said tube has a shearing point for separation when the conduit fails.

3. The safety system for conduits of claim 1, wherein said tube is an accordion tube.

4. The safety system for conduits of claim 2, wherein the tube is one of the following: annular convoluted metal core; helical convoluted PTFE core, stainless steel, rubber, or PVC.

5. The safety system for conduits of claim 1, wherein bolts maintain the breakaway flanges in a sealed position.

6. The safety system for conduits of claim 1 wherein pins maintain the breakaway flanges in a sealed position.

7. The safety system for conduits of claim 5 wherein bolts either tensile or sheer at the conduit fail.

8. The safety system for conduits of claim 6 wherein pins either tensile or sheer at the conduit fail.

9. The safety system for conduits of claim 3, wherein said tube has a shearing point that will break away with enough pressure at the conduit fail.

10. The safety system for conduits of claim 1, wherein said tube is affixed to the inner portion of the conduit by welding.

11. The safety system for conduits of claim 1 further comprising a turbulence coil inside said conduit.

12. The safety system for conduits of claim 1 further comprising a turbulence coil inside said tube.

* * * * *